Nov. 7, 1933.                C. J. BJORSON ET AL                1,933,537
                HOOD SUPPORTING STRUCTURE FOR BABY CARRIAGES
                    Filed Nov. 30, 1931         3 Sheets-Sheet 3
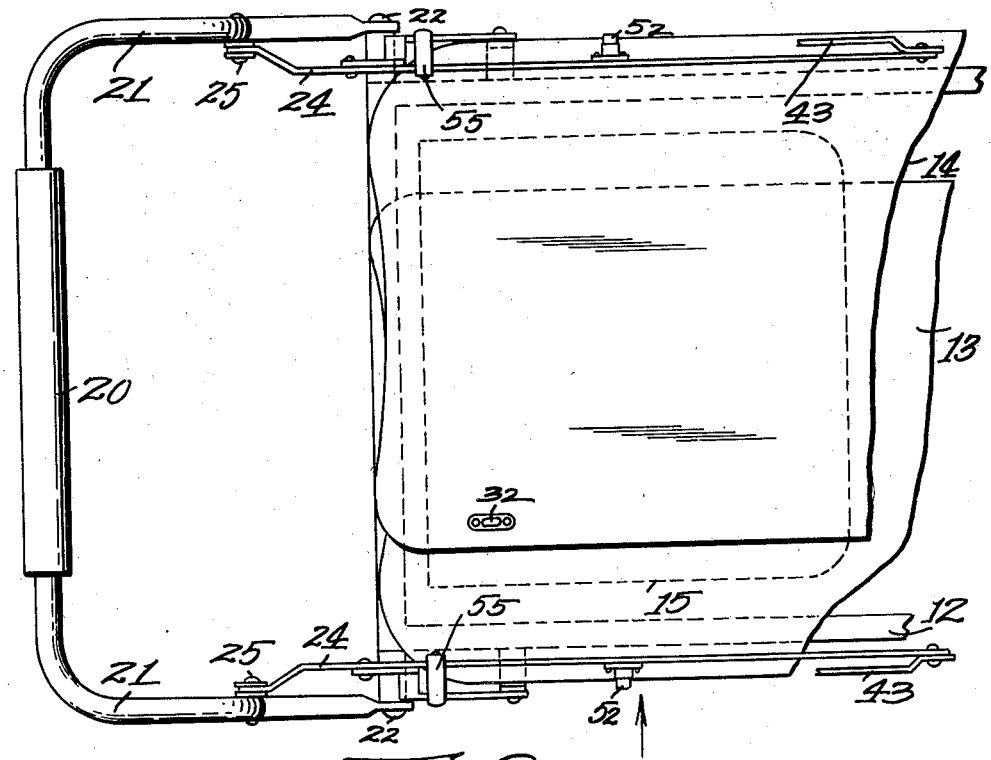
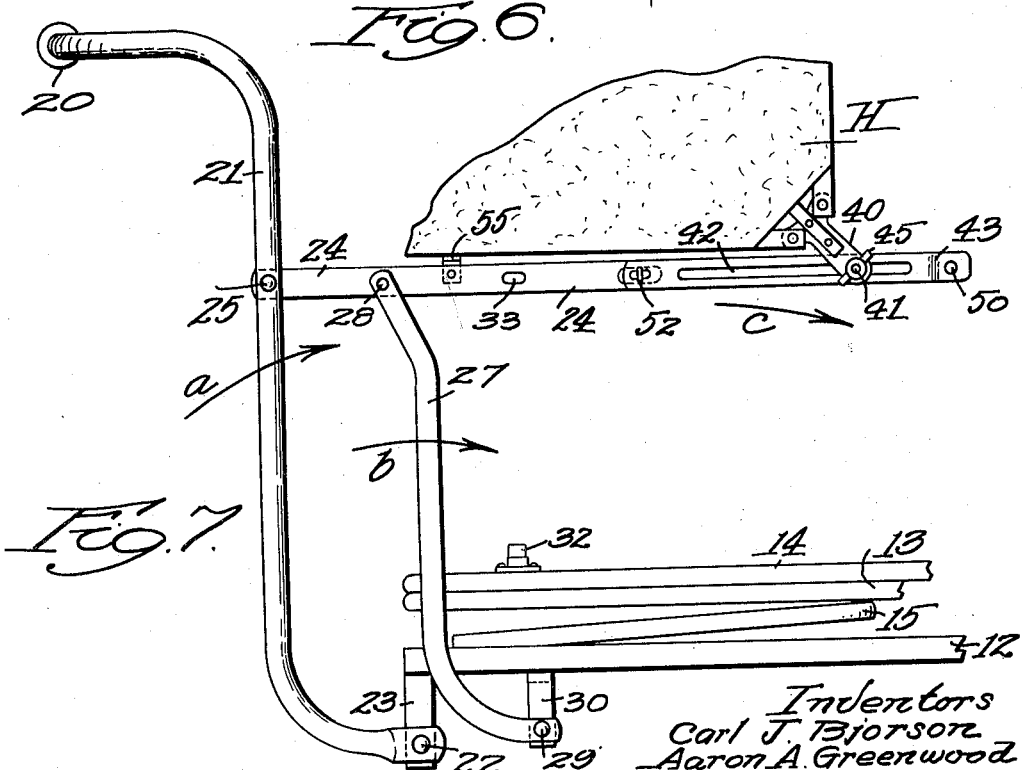
Inventors
Carl J. Bjorson
Aaron A. Greenwood Patented Nov. 7, 1933

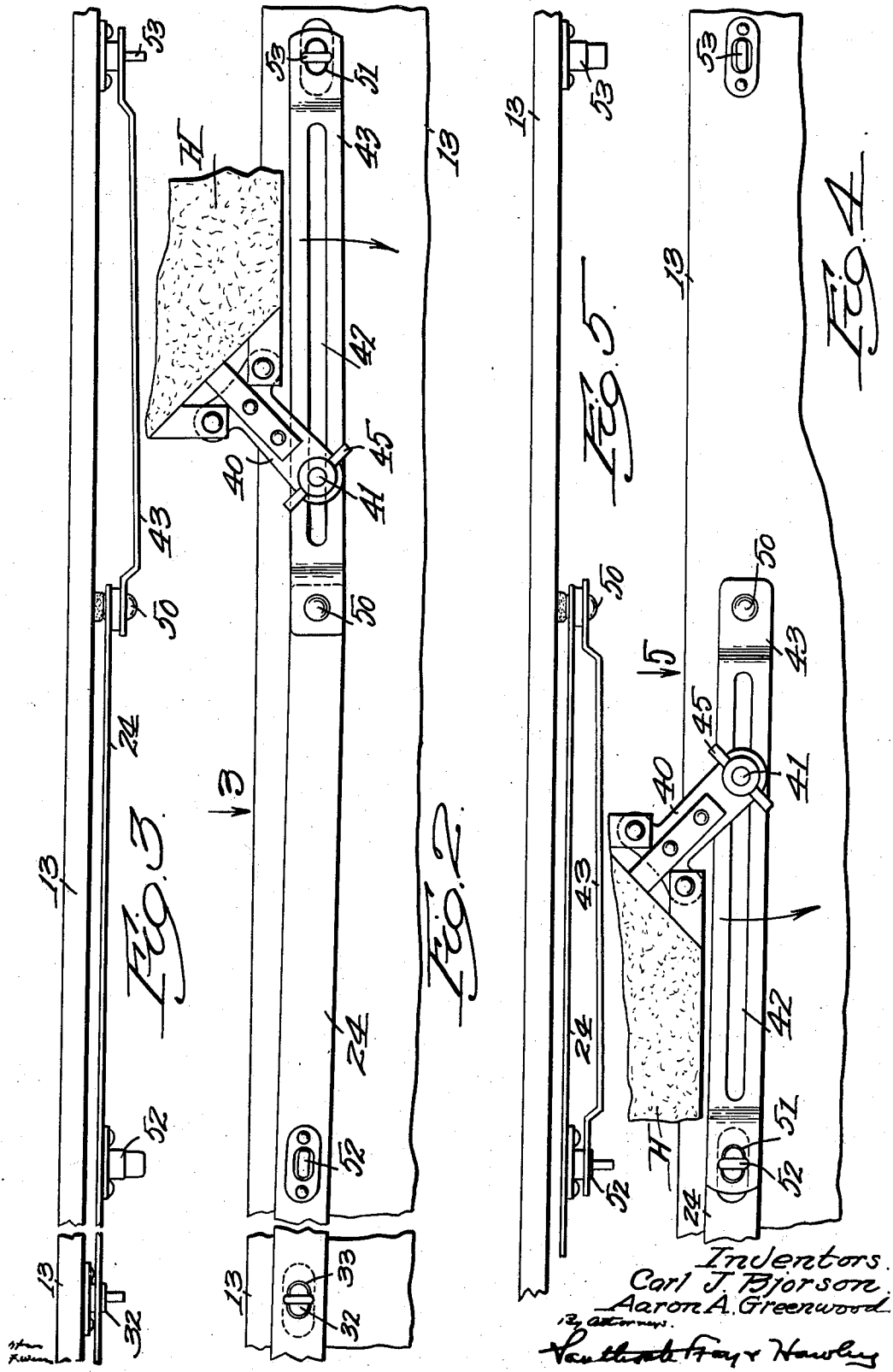

1,933,537

UNITED STATES PATENT OFFICE 1,933,537

HOOD SUPPORTING STRUCTURE FOR BABY CARRIAGES

Carl J. Bjorson and Aaron A. Greenwood, Gardner, Mass., assignors to O. W. Siebert Company, Gardner, Mass., a corporation of Massachusetts Application November 30, 1931
Serial No. 578,035

4 Claims. (Cl. 280—47)

This invention relates to baby carriages of the double end type in which it is desirable to provide for use of the hood at either end of the body as conditions vary.

It is the general object of our invention to provide improved means for supporting the hood at either the head or the foot end of the carriage body. We also provide a supporting structure so designed that the carriage may be folded without removal of the hood from said structure.

Our invention further relates to arrangements and combinations of parts which will be hereinafter described and more particularly pointed out in the appended claims.

A preferred form of the invention is shown in the drawings, in which

Fig. 2 is an enlarged side elevation of the hood-supporting structure;

Fig. 3 is a detail plan view, looking in the direction of the arrow 3 in Fig. 2;

Fig. 4 is a side elevation similar to Fig. 2 but showing the parts in a different position;

Fig. 5 is a detail plan view, looking in the direction of the arrow 5 in Fig. 4;

Fig. 6 is a partial plan view showing the carriage partly folded, and

Fig. 7 is a partial side elevation, looking in the direction of the arrow 7 in Fig. 6.

Figure 1:
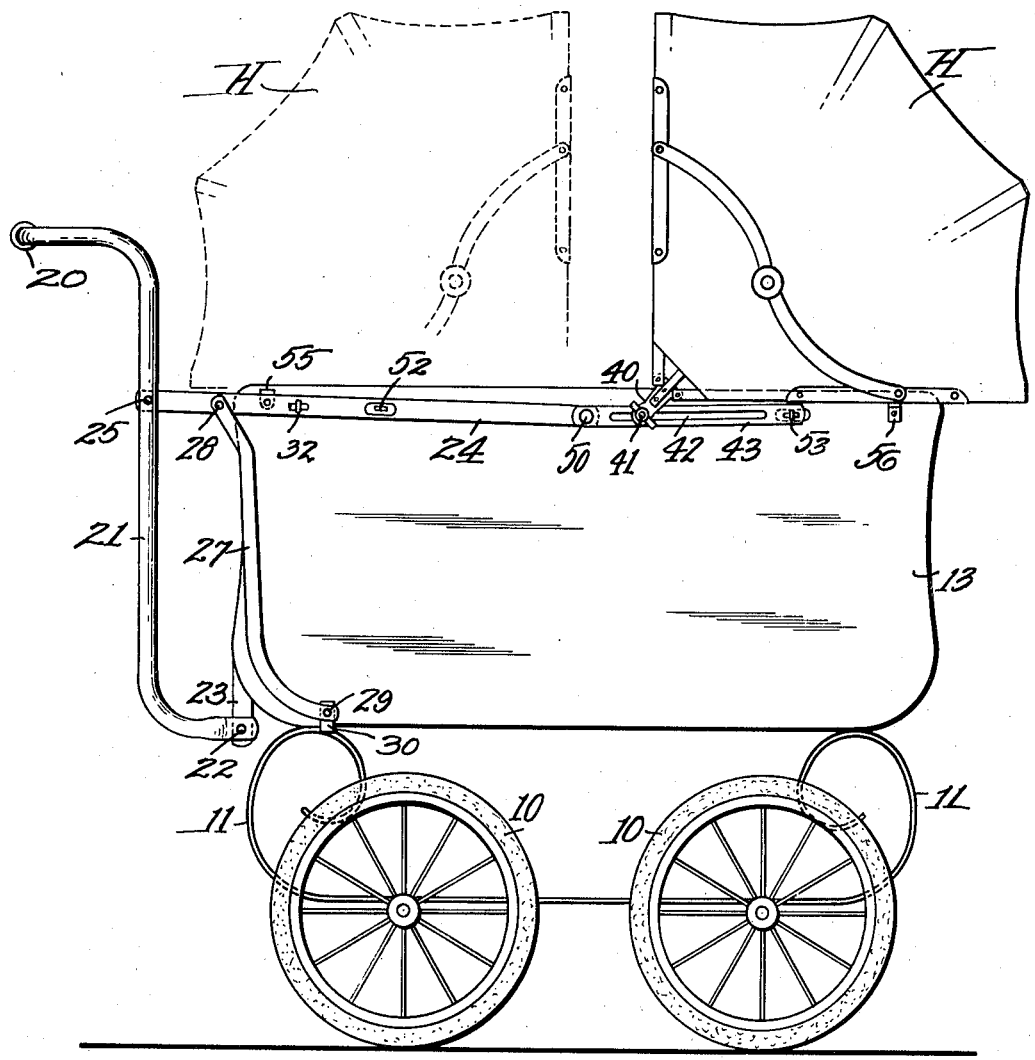
Fig. 1 is a side elevation of a baby carriage embodying our improvements.

Referring to the drawings, we have shown a baby carriage comprising wheels 10 mounted on running gear 11 on which the bottom or frame 12 (Fig. 7) of the baby carriage is supported. Sides 13 and 14 are hinged to the side edges of the bottom or frame 12 and end members 15 are similarly hinged to the end portions thereof.

When the carriage is to be folded, the ends 15 are folded inward over the bottom 12, as indicated in Figs. 6 and 7, and the sides 13 and 14 are then folded over the ends 15.

A handle 20 is mounted on handle bars 21 pivoted at 22 (Fig. 7) to supports 23 extending downward from the bottom or frame 12. Hood-supporting frame members or side bars 24 are pivoted at 25 to the handle bars 21 and are provided with braces 27 pivoted at 28 to the frame members 24 and having their lower ends pivoted at 29 to additional supports 30 secured to the under side of the bottom or frame 12. The handle bars 21 and braces 27 constitute parallel linkage for the hood-supporting frame members or side bars 24.

Locking studs or buttons 32 (Figs. 1 and 3) are mounted in the sides 13 and 14 and normally extend through slots 33 in the side bars 24, thus securing the handle bars 21 and side bars 24 in operative positions. When the carriage is to be folded, the heads of the studs 32 are turned to permit the studs to slip out of the slots 33.

A hood H, preferably of the folding type, is assembled on members 40 (Figs. 2 and 4), which members are pivoted on studs 41 slidable in openings 42 in slotted bars 43. The studs 41 are provided with wing nuts 45 by which they may be firmly secured to the slotted bars in any desired position.

The slotted bars 43 are each connected at one end by a pivot stud or rivet 50 to one of the side bars 24 and are each provided at the opposite end with a slot 51, adapted to receive a locking stud 52 (Fig. 5) in the bar 24 when the hood is to be used at the handle or head end of the baby carriage. The slots 51 are also adapted to receive locking studs 53 on the sides 13 and 14 when the hood is to be used at the foot end of the carriage.

Stops 55 on the side bars 24 support the lower edge of the hood when the hood is at the head end of the carriage, and the corresponding stops 56 on the sides 13 and 14 support the lower edge of the hood when at the foot end of the carriage.

During normal operation, the hood H may be used in either the full line or the dotted line position indicated in Fig. 1, and may be reversed in position by releasing the slotted bars 43 from the locking studs 53, then swinging them about their pivot studs 50, and securing them in reversed position by the locking studs 52, or vice versa. The hood may thus be very quickly and conveniently reversed as often as is desired.

When the carriage is to be folded, the slotted bars 43 are preferably swung to the position indicated in Figs. 4 to 7, in which position they are retained by the locking studs 52. When in this position it will be noted that the hood H is supported entirely by the hood-supporting bars 24 and that it has no point of attachment to the sides 13 and 14. Consequently the sides may be released by unlocking the studs 32, after which they may be folded, as indicated in Figs. 6 and 7, leaving the hood H supported in normal position by the side bars 24.

The handle bars 21, side bars 24 and links 27 may then be folded downward by movements longitudinally of the carriage, as indicated by the arrows a, b and c in Fig. 7, without removing the hood H from the side bars 24.

We have thus provided a construction by which the hood may be quickly and easily adjusted at either end of the baby carriage and also by which the hood and its supporting structure may be folded without removal of the hood from said structure.

Having thus described our invention and the advantages thereof, we do not wish to be limited to the details herein disclosed, otherwise than as set forth in the claims, but what we claim is:—

1. In a baby carriage having a body with inwardly folding side members, side bars supported in fixed position in said carriage and extending outside of and adjacent said side members and a carriage hood, in combination, means to detachably secure said side members to the adjacent side bars, devices on which said hood is mounted for sliding adjustment longitudinally of said body, and means to secure said devices in different longitudinal positions relative to said side bars, said devices being parallel to said side bars in all operative positions and being entirely supported by said side bars when in a certain operative position and being in part supported by said side bars and in part by said side members when in another operative position.

2. In a baby carriage having a body with inwardly folding side members, side bars supported in fixed position in said carriage and extending outside of and adjacent said side members and a carriage hood, in combination, a pair of slotted bars on which said hood is pivoted, said slotted bars being pivotally connected to said side bars, and detachable means to secure the free ends of said slotted bars to parts of said carriage in either of two reversed and defined operative positions relative to said side bars.

3. In a baby carriage having a body with inwardly folding side members, side bars supported in fixed position in said carriage and extending outside of and adjacent said side members and a carriage hood, in combination, supporting members for said hood, means to adjustably secure said hood to said supporting members at different selected points in their length, means to pivotally connect one end of each supporting member to its associated side bar, and means to detachably secure the free ends of said supporting members to parts of said carriage in either of two reversed operative positions.

4. In a baby carriage having a body with inwardly folding side members, side bars supported in fixed position in said carriage and extending outside of and adjacent said side members and a carriage hood, in combination, supporting members on which said hood is pivoted, said supporting members being pivoted at one end to said side bars, means to detachably secure the free ends of said supporting members to said side bars when in one operative position, and means to detachably secure the free ends of said supporting members to said folding side members when in a reversed operative position.

CARL J. BJORSON.
AARON A. GREENWOOD.